(12) United States Patent
Kuramoto et al.

(10) Patent No.: US 9,043,456 B2
(45) Date of Patent: May 26, 2015

(54) IDENTITY DATA MANAGEMENT SYSTEM FOR HIGH VOLUME PRODUCTION OF PRODUCT-SPECIFIC IDENTITY DATA

(75) Inventors: Annie C. Kuramoto, San Diego, CA (US); Xin Qiu, San Diego, CA (US); Ting Yao, San Diego, CA (US)

(73) Assignee: ARRIS Technology, Inc., Suwanee, GA (US)

( * ) Notice: Subject to any disclaimer, the term of this patent is extended or adjusted under 35 U.S.C. 154(b) by 81 days.

(21) Appl. No.: 13/407,081

(22) Filed: Feb. 28, 2012

(65) Prior Publication Data
US 2013/0227077 A1 Aug. 29, 2013

(51) Int. Cl.
*G06F 15/173* (2006.01)
*G06F 17/30* (2006.01)
*H04L 29/06* (2006.01)

(52) U.S. Cl.
CPC ...... *G06F 17/30595* (2013.01); *H04L 63/0823* (2013.01)

(58) Field of Classification Search
CPC ....................................... H04L 41/22
USPC ........... 709/219, 224; 380/283; 713/153, 172, 713/176, 189; 707/803, E17.005; 235/375; 705/28
See application file for complete search history.

(56) References Cited

U.S. PATENT DOCUMENTS

| | | | |
|---|---|---|---|
| 2002/0099631 A1* | 7/2002 | Vanker et al. | 705/28 |
| 2009/0031131 A1* | 1/2009 | Qiu et al. | 713/172 |
| 2011/0126275 A1* | 5/2011 | Anderson et al. | 726/8 |
| 2011/0258434 A1* | 10/2011 | Qiu et al. | 713/153 |
| 2011/0258654 A1* | 10/2011 | Lee et al. | 725/1 |
| 2011/0258685 A1* | 10/2011 | Qiu et al. | 726/5 |
| 2012/0089839 A1* | 4/2012 | Qiu et al. | 713/171 |

* cited by examiner

*Primary Examiner* — Frantz Jean
(74) *Attorney, Agent, or Firm* — Thomas A. Ward

(57) ABSTRACT

A method and apparatus is provided for maintaining inventory levels of identity data to be provisioned in electronic devices. The method includes monitoring over a communications network inventory levels of identity data records stored on a plurality of identity data personalization servers that each provision electronic devices with an identity data record. Additionally, if the inventory level on at least one of the identity data personalization servers falls below a minimum specified level, a refill request is sent to an identity data management authority requesting that additional identity data records be uploaded to the identity data personalization server.

19 Claims, 7 Drawing Sheets

US 9,043,456 B2

IDENTITY DATA MANAGEMENT SYSTEM FOR HIGH VOLUME PRODUCTION OF PRODUCT-SPECIFIC IDENTITY DATA

BACKGROUND

Digital information has become extremely important in all aspects of commerce, education, government, entertainment and management. In many of these applications, the ability to ensure the privacy, integrity and authenticity of the information is critical. As a result, several digital security mechanisms have been developed to improve security.

One standardized approach to today's digital security is referred to as the Public Key Infrastructure (PKI). PKI provides for use of digital certificates to authenticate the identity of a certificate holder, or to authenticate other information. A certificate authority (CA) issues a certificate to a certificate holder and the holder can then provide the certificate to a third party as an attestation by the CA that the holder who is named in the certificate is in fact the person, entity, machine, email address user, etc., that is set forth in the certificate. And that a public key in the certificate is, in fact, the holder's public key. People, devices, processes or other entities dealing with the certificate holder can rely upon the certificate in accordance with the CA's certification practice statement. A certificate is typically created by the CA digitally signing, with its own private key, identifying information submitted to the CA along with the public key of the holder who seeks the certificate. A certificate usually has a limited period of validity, and can be revoked earlier in the event of compromise of the corresponding private key of the certificate holder, or other revocable event. Typically, a PKI certificate includes a collection of information to which a digital signature is attached. A CA that a community of certificate users trusts attaches its digital signature and issues the certificates to various users and/or devices within a system.

Network-enabled devices are generally provisioned at the factory with identity data so that they may communicate with other network-enabled devices in a secure manner using an identity data system. The identity data typically includes a public and private key pair and a digital certificate. Illustrative examples of networked-enabled device include, without limitation, PCs, mobile phones, routers, media players, set-top boxes and the like.

The identity data may be provisioned in network-enabled devices at the time of manufacture. This can be a difficult and complex process for a number of reasons. For instance, traditional identity data include a limited number of attributes such as those specified by X.509, but typically do not include many product specific details such as a product name, model name and chip ID. However, identity data end users, such as device manufacturers, application providers or industry consortiums, are now more often requesting the inclusion of additional product details, attributes and attribute values in their identity data. These additional attributes and attribute values along with product and device specific details which are to be included in the identity data during the identity data generation, distribution and manufacturing process, are typically unique per product and device. Therefore, it can be difficult to manage these processes when there are a large variety of products. In particular, this becomes even more difficult when a manufacturer produces many different product lines and many different models within each product line. Moreover, these products may be produced at many different manufacturing facilities that are not necessarily co-located with one another, and which in fact may be located on different continents. These attributes and attribute values are incorporated into the identity data records that are eventually provisioned in the devices. This process of generating, managing and tracking all this data for each and every product is a challenging task that can become overwhelming difficult.

DETAILED DESCRIPTION

The method, techniques and systems shown herein are applicable to digital security mechanisms which can ensure that network-enabled devices can communicate with a guarantee of privacy, authenticity and integrity. For purposes of illustration only and with no loss of generally, the methods, techniques and systems described herein will be applied to identity data of the type that is generated by a PKI system. A single identity data unit as used herein refers to an item such as a private and public digital identity key pair or a symmetric key, for example. A digital certificate is generally associated with each identity data unit.

Illustrative examples of network-enabled devices include, without limitation, PCs, mobile phones, routers, media players, set-top boxes and the like. Each network-enabled device that is to be provisioned with identity data belongs to a product type. Each product type is identified by a unique identifier that may be referred to as an ID data type. A set of attributes and data format are associated with each ID data type. Values for these attributes are generally included in identity data that is provisioned in each network-enabled device. Examples of such attributes include a product name, model name, product manufacturer name, and the identity of the chipset used in the device. Data format defines how the attributes to be packaged and protected during the delivery process to the network-enabled device. Additional information may be associated with each ID data type. For instance, such additional information may include the factory location(s) where the products specified by each ID data type are to be manufactured, the server(s) on which the identity data is to be loaded and any inventory requirements which specify the number of identity data records that are to be maintained on the server.

Figure 1:
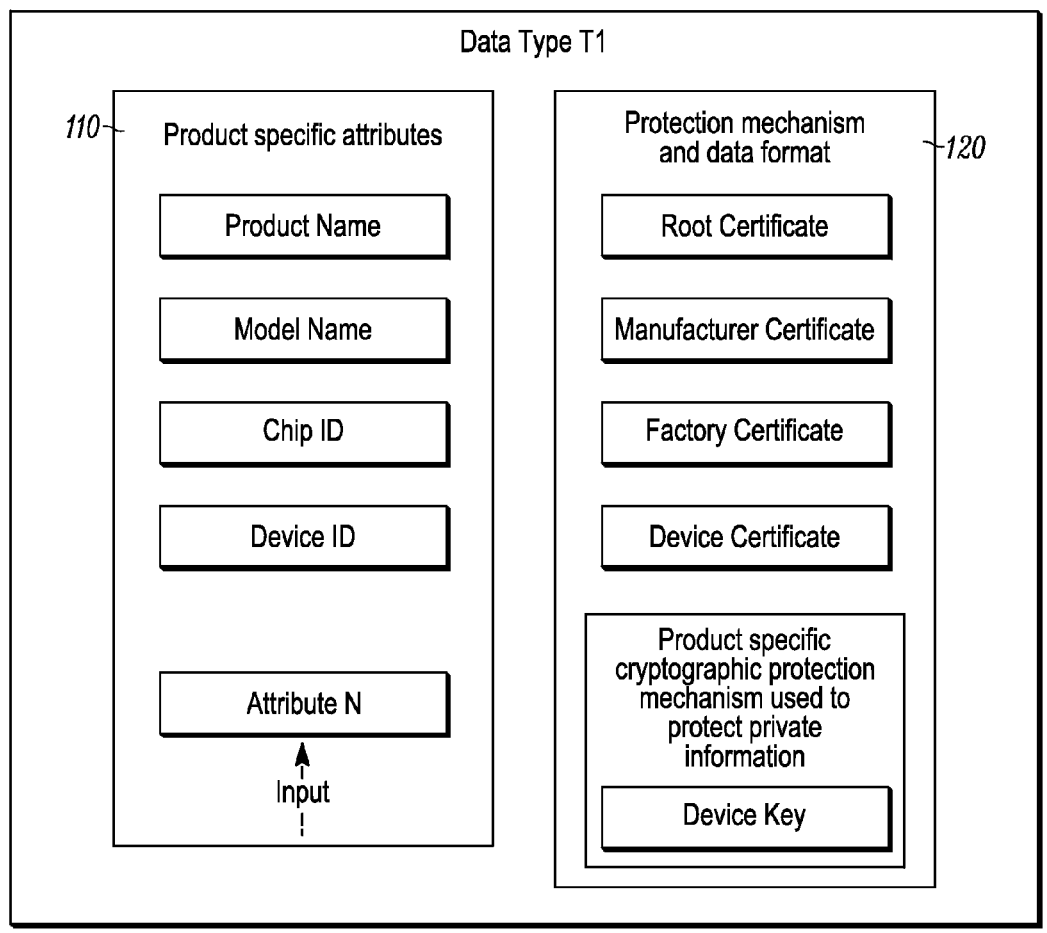
FIG. 1 shows one example of a set of attributes for an ID data type denoted T1.

FIG. 1 shows one example of the components defining an identity data type (ID data type) denoted T1. The product specific attributes 110 in this example include the product name, model name, chip ID and device ID. Also shown in FIG. 1 is the digital identity data format and identity data protection mechanism. If the identity data is PKI data, the identity data typically include a public and private key pair that maintains a cryptographic relationship. The public key is stored in the form of a certificate chain (shown in 120 as root certificate, a manufacturer certificate, a factory certificate and a device certificate). The private key (referred to in FIG. 1 as a device key) is the secret part of the identity data; it must be protected (kept secret) during transmission. A cryptographic protection mechanism is applied on the private key. The cryptographic protection mechanism (such as the encryption mechanism) for the identity type is specific to a product. Furthermore, the device private and public keys are unique per device and thus encrypted uniquely so that only the intended end device will have the capability to decrypt the private key.

Figure 2:
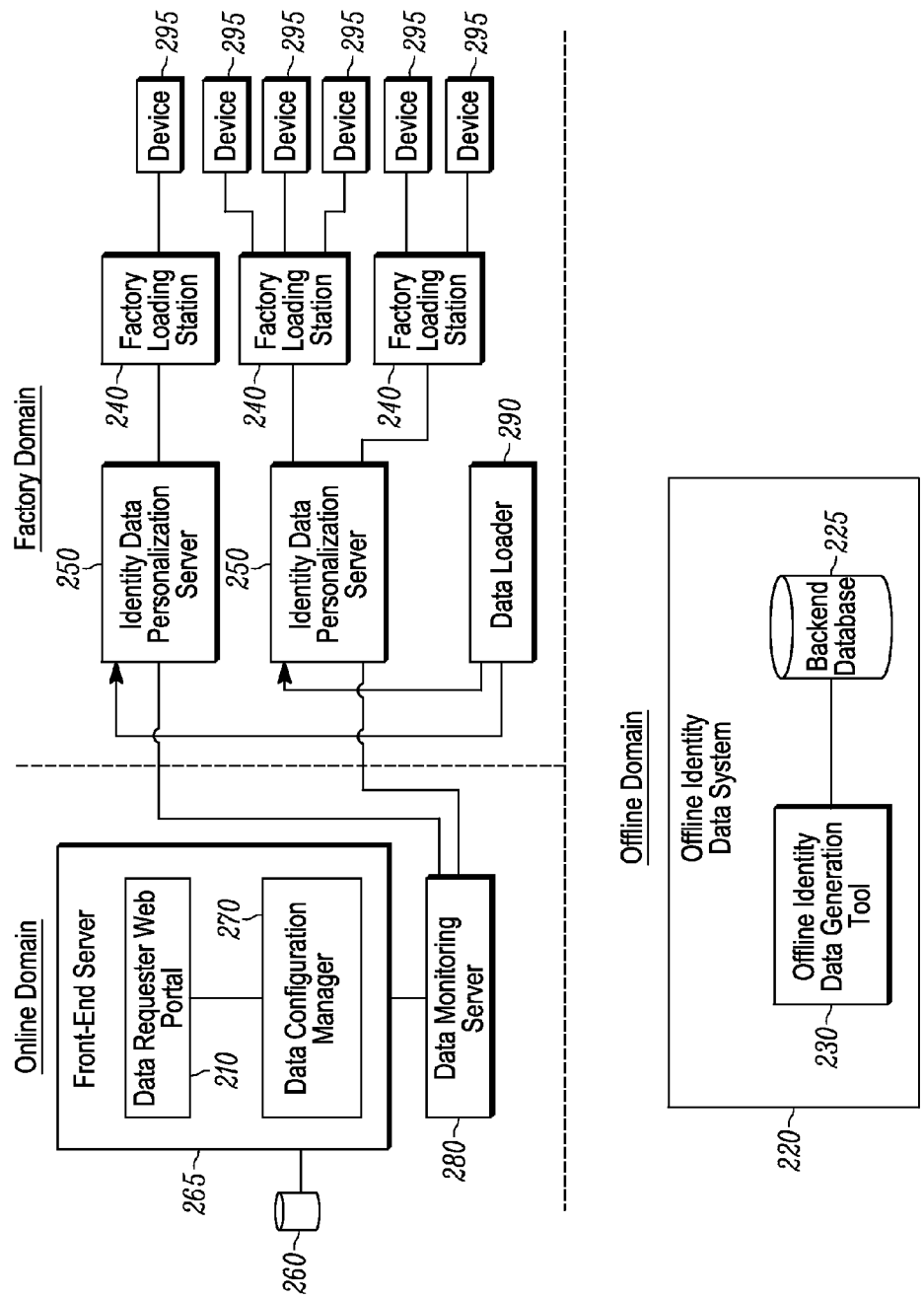
FIG. 2 shows one example of an operating environment in which the processes described herein for provisioning network-enabled devices with identity data may be implemented.

FIG. 2 shows one example of an operating environment in which the processes described herein for provisioning network-enabled devices with identity data may be implemented. It should be understood that each item described in connection with FIG. 2 is shown in a highly simplified manner in which a single entity (e.g., server, database, etc.) may be representative of more complex arrangements and systems.

In this example a factory domain represents one of multiple factory domains in which network-enabled devices are manufactured. The various factory domains may be widely dispersed over a large geographic region, which in some cases may extend over multiple nations and even continents. Each factory may produce a single type or single class of network-enabled devices (e.g., mobile phones) or multiple classes of devices (e.g., mobile phones, routers and set-top boxes). As part of the manufacturing process identity data such as PKI data is loaded into the network-enabled devices.

As shown in FIG. 2 the factory domain includes a number of entities employed to provision the devices with identity data. In particular, the factory domain includes identity data personalization servers 250 that are used to store identity data records and load them onto network-enabled devices 295 via factory data loading stations 240 that serve as an interface between the identity data personalization servers 250 and the network-enabled devices.

Also shown in the operating environment of FIG. 2 is an identity management system that includes an online portion and an offline portion. The online portion includes a front-end server 265 and a monitoring server 280. The front end server 265 hosts a data requester web portal 210 and a data configuration manager 270 and is associated with a front-end database 260. The offline portion of the identity management system is represented by an offline identity data generation system 220.

The web portal 210 provides a single front-end interface that a user may access using, for instance, a client-based application such as a conventional web browser, for example. The web portal 210 allows a user, such as a member of a product team, to establish and define new data identity types for new products.

New ID data types that are defined through the data requester web portal 210 are stored in the front-end database 260. Along with the new ID data type definition, the product team may also set minimum and maximum inventory requirements for the new data type. The minimum requirement denotes the minimum number of ID data units that must be available on the identity data personalization servers 250 at any given time. The maximum requirement denotes the maximum number of ID data units available on a given server at any given time. This information is used by the data monitoring server 280 during the ID data refill process, which is described later.

The data configuration manager 270 is employed to generate a downloadable file (containing new ID data type definitions) which can be transferred to the offline identity data generation system 220. The data configuration manager 270 converts the information concerning the ID data types obtained through the web portal 210 into a file format that is specifically to be used by the offline identity data generation system 220 to generate ID data types. The data configuration manager 270 makes the file available on a portable computer-readable storage medium (e.g., optical disks, smart cards, and flash memory devices such as cards, sticks and USB drives). A system operator manually transfers the storage medium to the backend database 225 of the identity data generation system 220 so that the requested identity data records can be generated.

After the downloadable files have been delivered to the identity data generation system 220, the system 220 generates the identity data records in accordance with the definitions and other information specified in the downloadable files. Additional details concerning the identity data generation system 220 is presented below. The identity data records which are created are then moved to a computer-readable storage medium and manually transferred to the online domain. The identity data records are then loaded onto the appropriate data personalization servers 250 via the data loader 290.

A data monitoring server 280 is used to monitor the inventory levels of the identity data records stored on each of the identity data personalization servers 250. The data monitoring server 280 is in communication with the front-end database 260 and thus has access to the various ID data types and corresponding minimum and maximum inventory requirements that have been defined. The data monitoring server 280 may communicate with the other elements of the online portion of the identity management system as well as the identity data personalization servers 250 in the factory domain over any suitable communication network(s) such as the Internet or other wide-area, packet-based communication network.

The data monitoring server 280 retrieves identity data minimum and maximum inventory requirements from the front-end database 260. When the data monitoring server 280 determines that the inventory levels for any given ID data type in any of the identity data personalization servers 250 have fallen below the minimum inventory requirement (which may differ from identity data personalization server to server) it automatically generates a request for new identity data records in the amount needed to reach the ID data type's maximum inventory requirement. This request is stored in the front-end database 260. In response to a request from the data monitoring server 280, the front-end server 265 accesses front-end database 260 to create a new request file as described above, which is then downloaded by a system operator onto a computer-readable storage medium so that it can be manually delivered to the offline identity data generation system 220.

Referring again to FIG. 2, the offline identity data generation system 220 includes an offline identity data generation tool 230 that resides on a server. The system 220 is maintained offline for security reasons and so that identity data can be generated in advance of the time is needs to be uploaded onto an identity data personalization server 250, thereby ensuring that the delivery of identity data records to the personalization servers 250 is not delayed because of the time needed to generate the computationally-intensive identity data records. The identity data generation system 220 also includes a backend database 225, which is a database of identity data records. These records may pertain to issued digital certificates, original requests for new digital certificates or secure data, audit data, organization information, product configurations, user information, and other record types as necessary.

Figure 3:
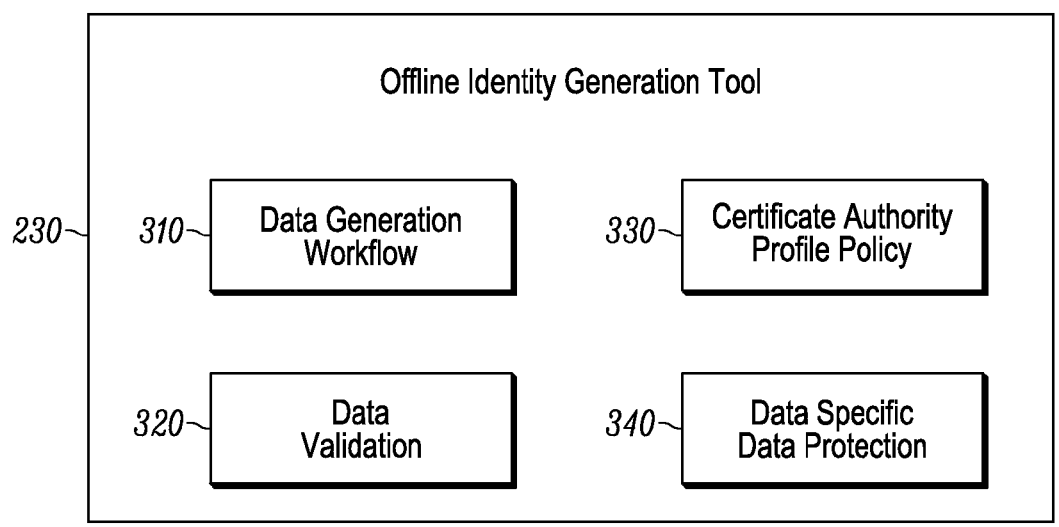
FIG. 3 shows one example of the identity data generation tool shown in FIG. 2.

Identity data generation tool 230 controls the overall operation of the identity data generation system 220 and typically includes one or more physical servers with one or more physical storage devices and databases as well as various processing engines. The data generation tool 230 also includes one or more service components that typically reside on the servers which execute one or more applications that provide various services. One example of the identity data generation tool 230 is shown in FIG. 3. As shown, the identity data generation tool 230 includes four logical service components or modules: a data generation workflow component 310, a data validation component 320, a CA profile policy component 330 and a data specific protection component 340.

The data generation workflow component 310 defines the sequence of actions that the system performs to generate and validate the necessary identity data for a specific ID data type. These actions may include, for example, "generate RSA key pair," "verify certificate" and "encrypt private identity data," and so on. Each ID data type can have only one workflow. The workflow management component thus defines and manages the relation between products and workflows. When the identity data generation system 220 receives a request for new identity data records for a certain product, the product's workflow is executed to generate the requested data.

The CA profile policy component 330 maintains the specific policies (e.g., certificate validity, cryptographic algorithm object identifier(s), usage of policy constraints extension) used by the certificate authority. These policies are established by the system administrator through the data requester web portal 210. The product specific protection component 340 implements a mechanism for protecting the identity data, which may differ for different ID data types and which is selected by the product team or the system administrator. The data validation component 320 confirms that the identity data which is generated is valid. To accomplish the validation of the generated identity data, the data validation component 320 reads the fully generated identity data from storage, removes the applied protection mechanisms; then, verifies that the unprotected identity data is not corrupted during the generation process by checking that each identity record (which normally has the private, public key and certificates) still maintains its cryptographic relationship.

Figure 4:
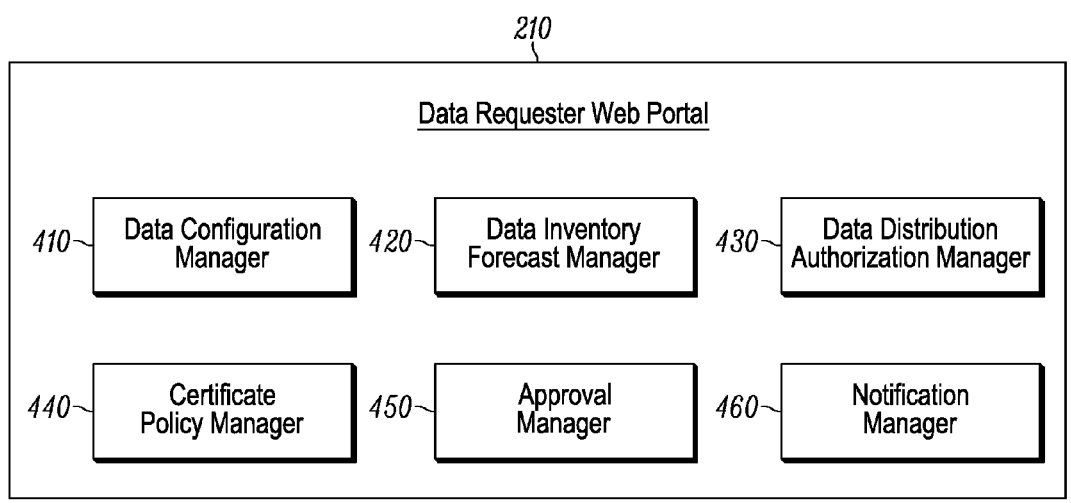
FIG. 4 shows one example of the data requester web portal shown in FIG. 2.

FIG. 4 shows one example of the data requester web portal 210 in more detail. The web portal 210 typically includes one or more physical servers with one or more physical storage devices and databases as well as various processing engines. In addition, in FIG. 4 the web portal 210 includes one or more service components that typically reside on the servers which execute one or more applications that provide various services. In FIG. 4 six logical service components or modules are shown: data configuration manager 410, data inventory forecast manager 420, data distribution authorization manager 430, certificate policy manager 440, optional approval manager 450 and notification manager 460.

The data configuration manager 410 allows members of the product team to request the creation of new data types by selecting various attributes such as the previously mentioned product specific attributes (e.g. product name, model name, chip ID), attribute values (e.g. product names, trademarks and designations) and protection mechanisms. The protection mechanisms are defined so that the secret part of the identity data generated is protected; it is typically determined by the protection mechanisms supported by the device chip used in a product.

The data inventory forecast manager 420 allows product team members to define volume forecasts for new or existing data types. That is, users can anticipate the number of products that will be manufactured over some period of time, which in turn dictates the number of data identity data records that will be needed over that time period. This information can be used by the team members to specify the number of identity data records that should be maintained by the identity data personalization servers located at the factory sites. For instance, the user can specify a minimum and maximum number of identity data records that should be maintained on identity data personalization servers 250 at all times. As mentioned previously, this information is used by the data monitor server 280 to determine when to automatically trigger identity data requests. This in turn reduces the probability of depleting the inventory of available identity data records, which can interrupt the manufacturing process, can be reduced. Likewise, by specifying a maximum number, the probability that some identity data records will go unused can also be reduced. The inventory levels specified by the product team can remain static, or they can be refined in accordance with other parameters and rules in order to refine the inventory of records that are to be maintained on the servers 250.

The data requester web portal 210 also includes a data distribution authorization manager 430, which allows product team members and/or system administrators to specify the servers that are to be authorized to distribute identity data for new or existing data types. The certificate policy manager 440 allows system administrators to define and enforce certificate authority specific policies for existing or newly created ID data types. In addition, system administrators and/or product team members can request the implementation of protection mechanisms for a new product, which they can then associate with new ID data types. An optional approval manager 450 allows appointed personnel, such as a project team supervisor, for instance, to accept or reject requests for new ID data types which have been made by product team members. The data requester web portal 210 also includes a notification manager 460 which automatically delivers email notifications or confirmations to parties involved in identity data provisioning process. For instance, the system operator may be notified that request files are ready to be transferred from the online system to the offline system by the notification manager 460 employed by the data requester web portal 210.

The inventory levels specified by product team members using the data inventory forecast manager 420 are stored on front-end database 260 so that they are accessible to the data monitoring server 280. The data monitoring server 280 periodically queries the inventory levels on the identity data personalization servers 250. If inventory levels remain above the minimum thresholds then no data requests are generated. On the other hand, if the data monitoring server 280 determines that inventory levels for a particular ID data type have fallen below the minimum threshold specified for one or more of the personalization servers 250, the data monitoring server 280 sends a data request to the front-end database 260. The number of data records requested in each data request is typically equal to the difference between the maximum and minimum inventory thresholds levels that have been specified for each identity data personalization server 250. Separate data requests are made for each given data type that has fallen below the minimum threshold.

Figure 5:
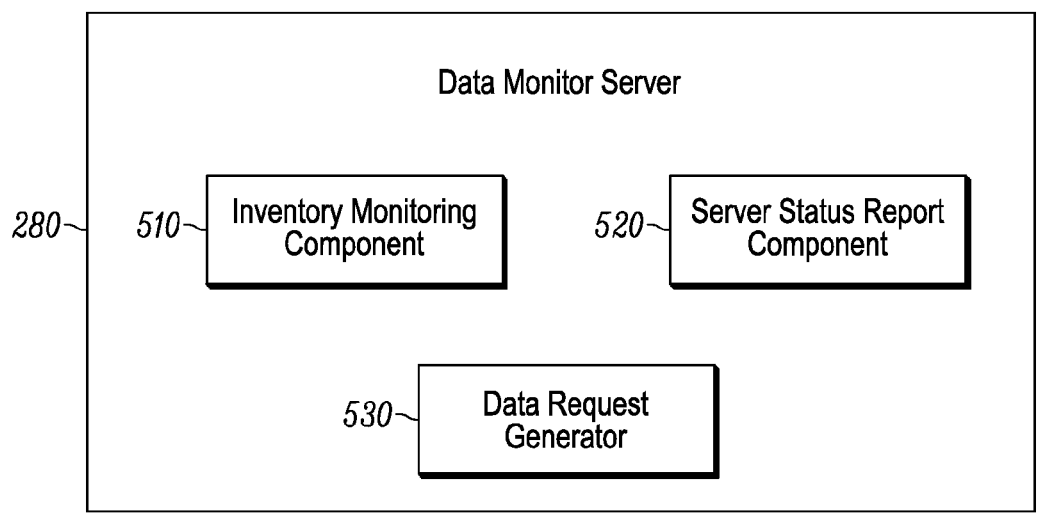
FIG. 5 shows one example of the data monitoring server shown in FIG. 2.

FIG. 5 shows one example of the data monitoring server 280 in more detail. In this example the data monitoring server 280 includes an inventory monitoring component 510, a server status report component 520 and a data request generator 530. The inventory monitoring component 510 periodically queries the inventory levels of the identity data personalization servers 250. The server status report component 520 is a web portal that presents to product team members and system operators the inventory levels of the personalization servers 250. The data request generator 530 generates new identity data requests when the inventory monitoring component 510 detects data inventories that fall below their specified thresholds which have been defined by the product team using the data requester web portal 210.

Figure 6:
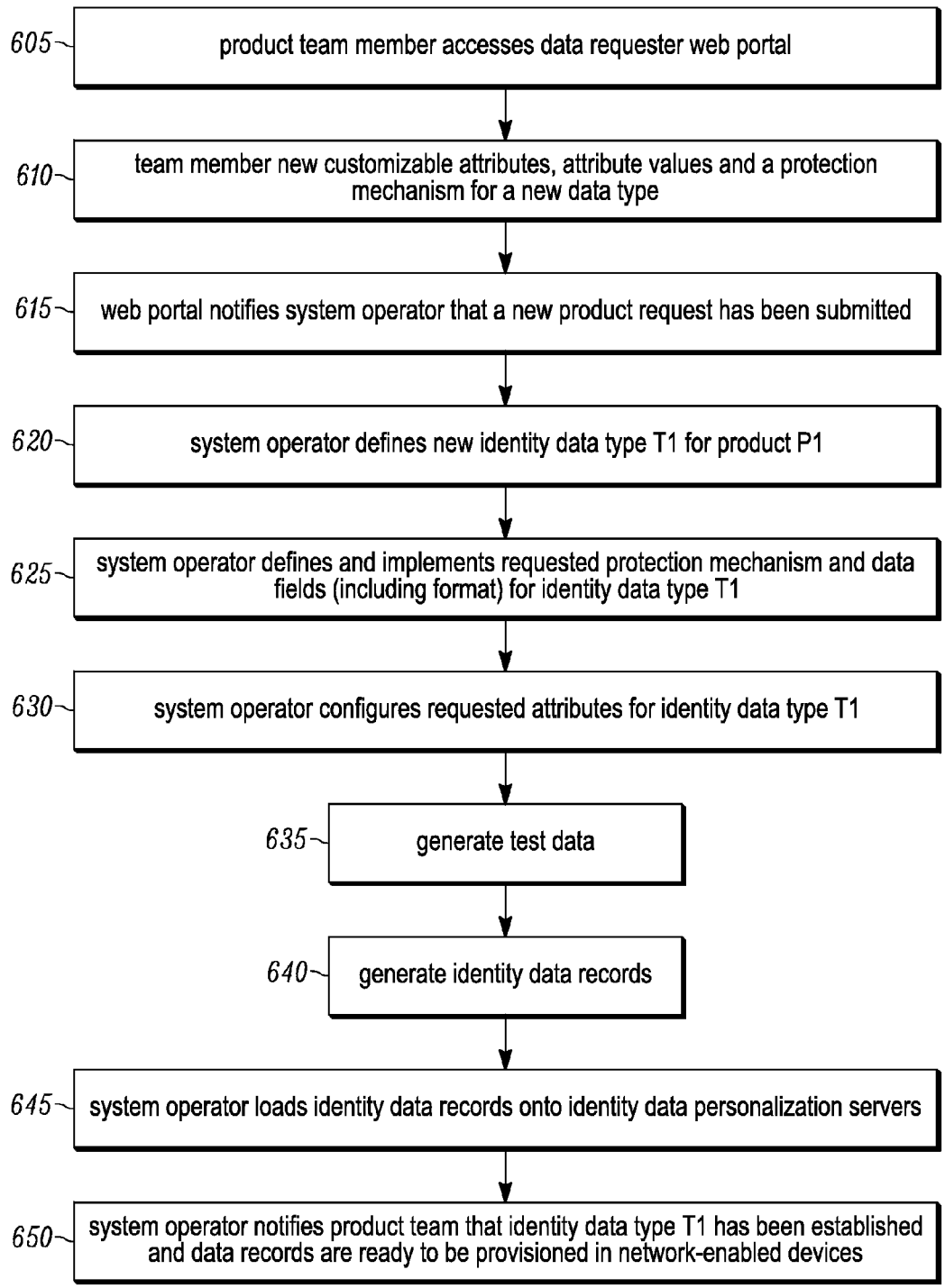
FIG. 6 is a flowchart illustrating one example of how the identity data management system can be used to create customized identity data for a new product.

FIG. 6 is a flowchart illustrating one example of how the identity data management system can be used to create customized identity data for a new product P1. The method begins at step 605 when a product team member logs on to or otherwise accesses the data requestor web portal 210 to request new customized ID data types. Since this is a new data type, the user (e.g., a product team member) uses the data configuration manager 410 to specify new customizable attributes, attribute values and a protection mechanism. The user may also specify production forecasts and manufacturing locations using the forecast manager 420. The manufacturing locations can be used to determine the identity data personalization servers that are to receive the identity data records. Next, at step 610, in response to the request for a new data type, the web portal 320 notifies a system operator (via, e.g., e-mail) that a new product request has been submitted.

Because the request is for an ID data type, with new attributes and a new protection mechanism, a new ID data type T1 for the product P1 is defined (step 620) and the new attributes and new protection mechanisms are implemented (step 625) based on information provided by the product team. Implementation is needed since the new attributes and protection methods did not exist previously. Likewise, at step 630, the system operator configures the requested attributes for ID data type T1 using the data configuration manager tool 410. If the identity data is PKI data, these attributes will ultimately be encoded in digital certificates (e.g. X.509 certificates) that form part of the PKI data.

After the configuration of the ID data type T1 for product P1 has been completed, test data is generated at step 635. While optional, this step is recommended to avoid errors during actual production. The system operator then initiates the generation of the actual identity data records at step 640. It should be noted that if optional step 635 is performed, it may be performed sequentially or concurrently with step 640. The number of records that is generated is equal to the maximum number specified by the product team when they requested the new ID data type. At step 645 the system operator loads the identity data records onto the identity data personalization server(s) 250 which has been identified to host these records. The system operator then notifies the product team at step 650 that ID data type T1 has been established and that data records are ready to be provisioned in network-enabled devices of product type P1. At this point the product team may begin personalizing individual devices of product P1 which have been manufactured at the designated factory site(s).

Figure 7:
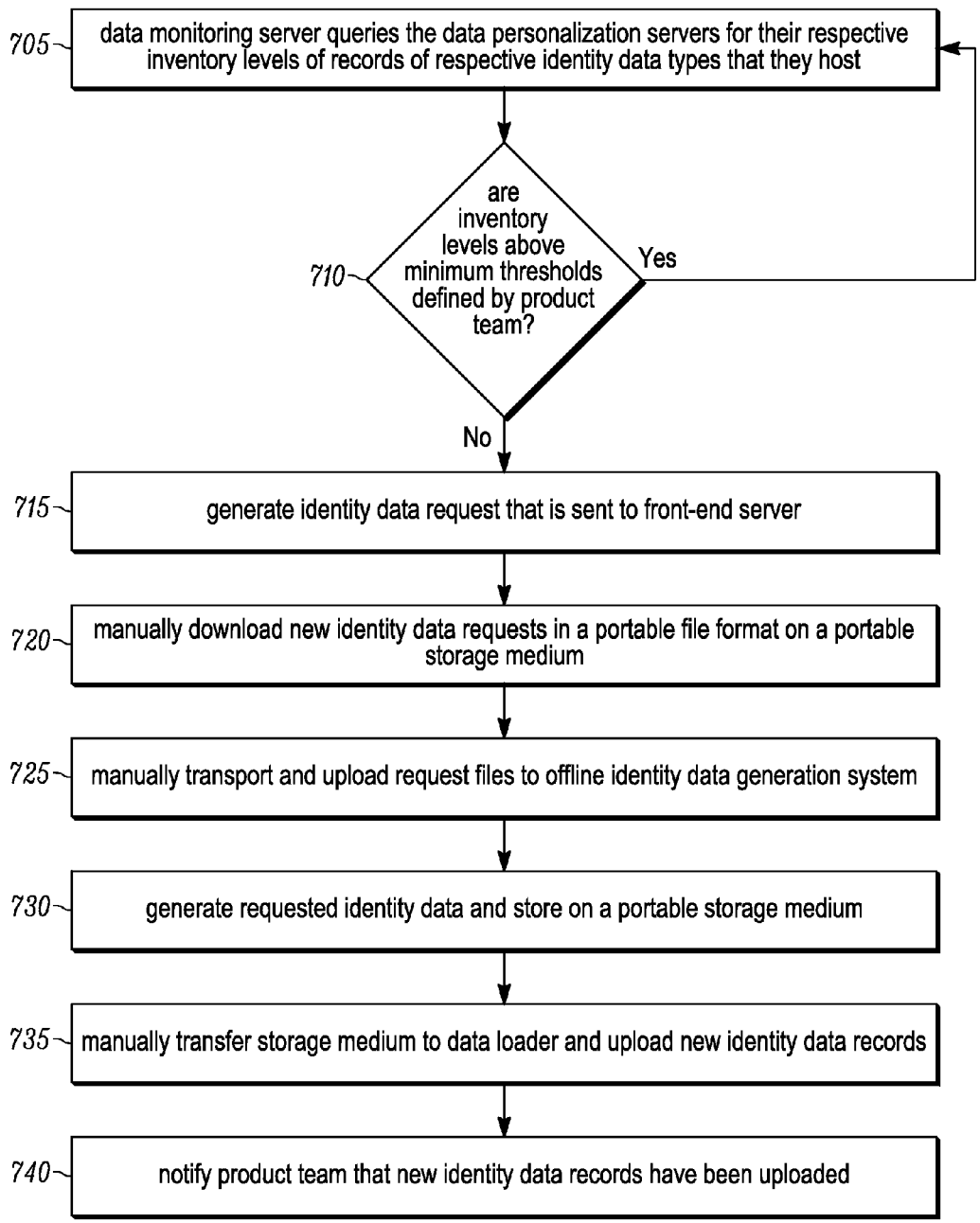
FIG. 7 is flowchart illustrating how the servers can be refilled with identity data records.

After the identity data provisioning process has begun, the data monitoring server 280 will ensure that the designated identity data personalization servers 250 maintain the requisite inventory levels which have been specified by the product team. The process by which the servers are refilled with identity data records will be illustrated by the flowchart of FIG. 7, with further reference to FIG. 2.

The identity data monitoring and refill process begins at step 705 when the data monitoring server 280 queries the data personalization servers 250 for their respective inventory levels of records for the various ID data types that they host. At decision step 710 the data monitoring server 280 determines whether or not the inventory levels are above their minimum thresholds defined by the product team. If inventory levels are above their minimum thresholds, the process returns to step 705 where the data monitoring server 280 continues to periodically query the data personalization servers 250 for their inventory levels. If the inventory level on any data personalization server 250 is found to be below its minimum threshold for a particular ID data type, then at step 715 the data monitoring server 280 automatically generates an identity data request that is sent to the front-end server 265. Notification is also sent to the system operator. The request specifies all the information needed to generate the new ID data records, including the number of identity data records that should be generated and the server location where the identity data records are to be loaded. Separate data requests are made for each unique ID data type and location combination that has fallen below the defined minimum threshold.

While a data personalization server 250 is waiting to be refilled with identity data records for ID data type T1, the usage of its remaining records for ID data type T1 will not be interrupted unless the data is depleted. Therefore, the minimum threshold level should be accurately defined to prevent the records from being completely depleted.

The system operator accesses the front-end database 260 at step 720 after receiving notification of the new identity data request and downloads the requests in a portable file format on a portable computer-readable storage medium. The requests specify all the information necessary for the identity data records to be generated by the offline identity data generation system 220. At step 725 the system operator manually transports the request files to the offline identity data generation system 220 and uploads the request to the back-end database 225 by using identity data generation tool 230.

At step 730 the offline identity data generation system 220 generates the requested identity data and outputs the identity data in a portable file format and stores it on a portable computer-readable storage medium. In addition, the offline identity data generation system 220 may store a history of the generated identity data records in the back-end database 225 for reporting, backup and revocation purposes. The system operator then manually transfers the computer-readable storage medium to the data loader 290 at step 735 and uploads the new identity data records. The data loader 290, in turn, uploads the identity data to the particular personalization server 250 for which the identity data was generated. At this point, the inventory has been re-filled for ID data type T1 on the particular personalization server 250 whose inventory was low. An optional notification may be sent to the product team at step 740.

In some cases when a new product is to be produced, the creation of the new ID data type does not need to perform the full set of steps shown in FIG. 6. For instance, if the new identity type is similar to or the same as a previously created ID data type, the product team may use the previously created ID data type as a template. In this case the new and previously created ID data types may only differ in their attributes values, and accordingly the product team may only need to provide these values when a new product is to be produced and loaded with identity data, along with production forecasts, manufacturing locations and the like. Moreover, in addition to having the same ID data type as one previously created, even the attributes, attribute values and product forecasts may be the same for a new ID data type as for the previously created ID data type. In this situation, only the manufacturing location needs to be specified if the manufacturing location for the product is different.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media.

For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The invention claimed is:

1. A method for maintaining inventory levels of identity data to be provisioned in electronic devices, comprising:
   monitoring over a communications network inventory levels of identity data records, the identity data records containing a public and private key pair in a certificate identifying a device, stored on a plurality of identity data personalization servers that each provision electronic devices with one of the identity data records; and
   if the inventory level on at least one of the identity data personalization servers falls below a minimum specified level, sending a refill request to an identity data management authority requesting that additional identity data records be uploaded to said at least one identity data personalization server.

2. The method of claim 1 wherein the refill request is sent over the communication network to a server associated with the IDMA.

3. The method of claim 1 wherein each identity data record is of a particular identity data type, and further comprising:
   individually monitoring inventory levels stored on the plurality of identity data personalization servers of the identity data records for each different identity data type;
   if the inventory level of the identity data records for a first identity data type on at least one of the identity data personalization servers falls below the minimum specified level, sending a refill request to an IDMA requesting that additional identity data records of the first identity data type be uploaded to said at least one identity data personalization server.

4. The method of claim 3 wherein each identity data type on each of the identity data personalization servers has its own minimum and maximum specified inventory levels.

5. The method of claim 1 wherein the minimum specified level is specified by a user through a web portal associated with the IDMA.

6. The method of claim 1 further comprising generating the identity data with an offline identity data generating system.

7. The method of claim 1 wherein at least two of the identity data personalization servers are located at different factory sites where the network-enabled devices are manufactured or repaired, each of the identity data personalization servers maintaining unique ones of the identity data records.

8. An identity data management system providing identity data to identify devices, the management system comprising personalization data servers each including a processor and a memory for storing code to control the processor to form manager components, the manager components comprising:
   a data configuration manager configured to receive user input defining new identity data types that each include one or more attributes to be included in identity data records, the identity data records containing a public and private key pair in a certificate identifying a device, the identity data records belonging to each respective new identity data type;
   a data inventory forecast manager configured to receive user input specifying how many unique ones of the identity data records are to be maintained on each of a plurality of identity data personalization servers that provisions network-enabled devices with the identity data records;
   a data distribution authorization manager configured to receive user input specifying the identity data types that are to be maintained on each of the identity data personalization servers; and
   a server hosting a database configured to store a data definition file for each new identity data type defined through the data configuration manager and a refill request file specifying how many of the unique identity data records of each identity data type are to be uploaded to one or more identity data personalization servers that provision electronic devices with the identity data records, said data definition files including the respective definitions of the new identity data types.

9. The identity data management system of claim 8 further comprising a notification manager configured to notify a system operator when the refill request files or the data definition files are ready to be transferred to an off-line identity data generation system.

10. The identity data management system of claim 8 wherein the data inventory forecast manager is further configured to receive user input specifying a minimum and maximum number of the identity data records that are to be maintained on each of the plurality of identity data personalization servers at any given time.

11. The identity data management system of claim 8 wherein the data definition file for each new identity data type includes attributes specifying a format in which the identity data records are to be provided and a protection mechanism to be used.

12. The identity data management system of claim 8 further comprising a data monitor that monitors inventory levels on each of the identity data personalization servers, said refill request file for the new identity data records being received by the server from the data monitor.

13. The identity data management system of claim 8 further comprising an off-line identity data generation system configured to receive the refill request files and the data definition files manually transferred thereto from the server and generate the identity data records requested therein.

14. The identity data management system of claim 13 wherein the off-line identity data generation system includes a data generation workflow component configured to specify a sequence of actions to be performed to generate the requested identity records, said sequence of actions being determined at least in part on the definition of each identity data type included in the data definition files.

15. The identity data management system of claim 8 wherein at least one of the attributes to be included in the identity data records is a product attribute that reflects at least one characteristic of the electronic device.

16. The identity data management system of claim 8 further comprising at least one data loading server configured to: (i) receive the identity data records generated by the off-line identity data generation system; (ii) load each of the identity data records onto its respectively designated identity data personalization server; and (iii) ensure that each identity data record is only loaded onto an identity data personalization server a single time so that each electronic device is provisioned with a unique identity data record.

17. At least one non-transitory computer-readable medium encoded with instructions which, when executed by a processor, performs a method including:
   receiving user input defining new identity data types each associated with a particular product type, the definition of each new identity data type including one or more product attributes to be included in identity data records, the identity data records containing a public and private key pair in a certificate identifying a device, the identity data records belonging to each respective new identity data type;
   generating a data definition file for each of the new identity data types that are defined based at least in part on the user input that is received;
   receiving refill requests each specifying a number of unique ones of the identity data records of each identity data type to be uploaded to one or more identity data personalization servers that provision electronic devices with the identity data records; and
   downloading the data definition files and refill request files so that they can be transferred to an identity data generation system that generates the identity data records based on the data definition files and the refill request files.

18. The non-transitory computer-readable medium of claim 17 further comprising:
   monitoring over a communications network inventory levels of the identity data records maintained on the identity data personalization servers that provision electronic devices with identity data records; and
   generating a refill request in response to an inventory level on at least one of the identity data personalization servers falling below a specified level.

19. The non-transitory computer-readable medium of claim 18 further comprising:
   generating the identity data records based on the data definition files and refill request files; and
   uploading each of the identity data records onto its respectively designated identity data personalization server and ensuring that each identity data record is only loaded onto an identity data personalization server a single time so that each electronic device is provisioned with a unique one of the identity data records.

* * * * *